Dec. 20, 1955  J. BOLSEY  2,727,447
PHOTOGRAPHIC CAMERA MECHANISMS
Filed Aug. 27, 1952  3 Sheets-Sheet 2

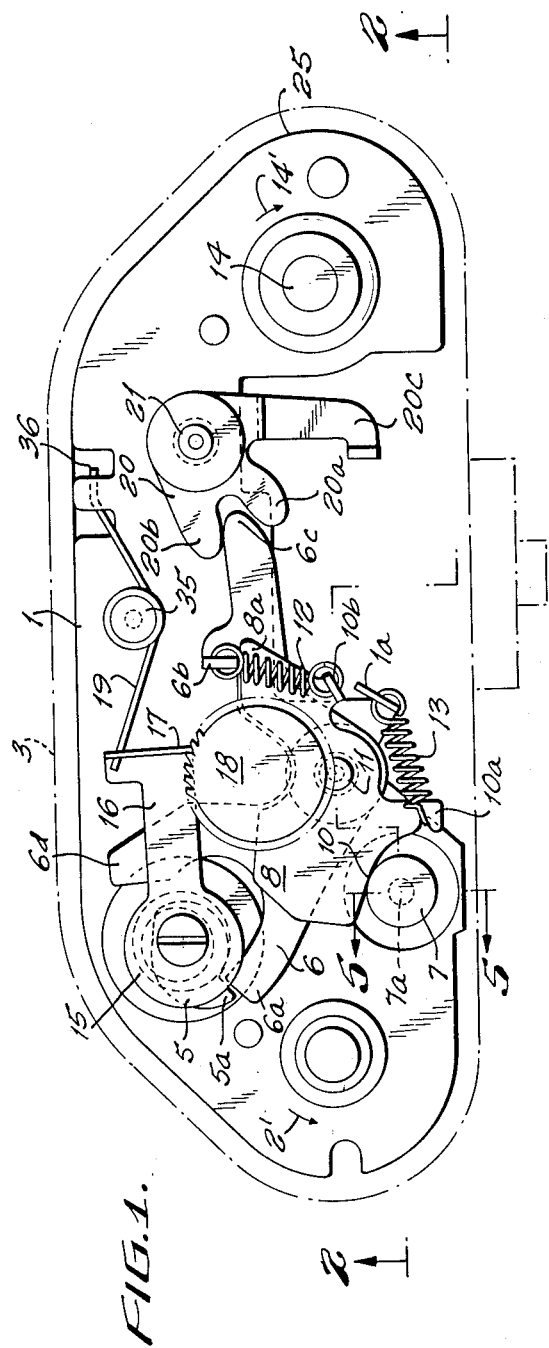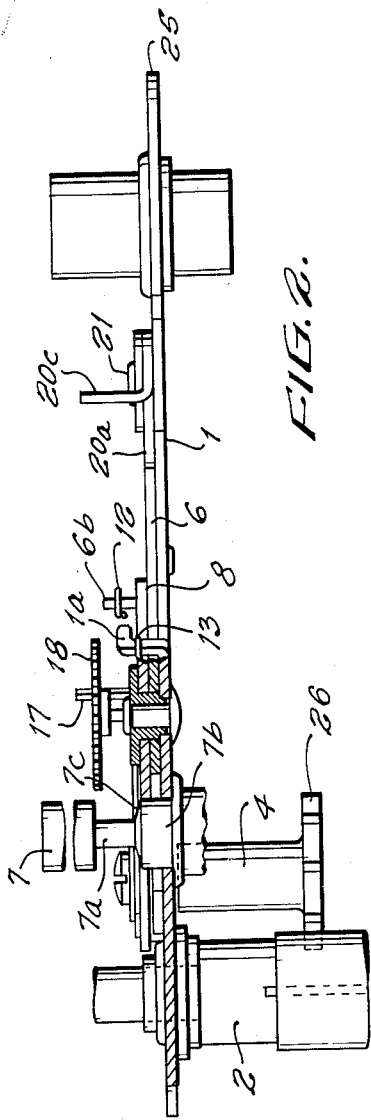

INVENTOR.
JACQUES BOLSEY
BY

Dec. 20, 1955   J. BOLSEY   2,727,447
PHOTOGRAPHIC CAMERA MECHANISMS
Filed Aug. 27, 1952   3 Sheets-Sheet 3

INVENTOR.
JACQUES BOLSEY
BY

United States Patent Office 2,727,447
Patented Dec. 20, 1955

2,727,447
PHOTOGRAPHIC CAMERA MECHANISMS
Jacques Bolsey, New York, N. Y.
Application August 27, 1952, Serial No. 306,539
7 Claims. (Cl. 95—31)

The present invention relates to photographic camera mechanisms, and more particularly to those mechanisms which are adapted to prevent overwinding of a film strip in the camera and to prevent a double exposure.

One of the objects of the present invention is to provide a photographic camera with a means for preventing overwinding of a film strip.

Another object of the present invention is to provide a photographic camera with a means for preventing a double exposure due to carelessness of the operator.

A further object of the present invention is to provide a unitary mechanism which is of exceedingly simple and efficient construction and at the same time adapted to prevent both overwinding and a double exposure.

Yet another object of the present invention is to provide a mechanism of the above type which will not create a shock on the shutter operating member of the camera.

A still further object of the present invention is to provide a mechanism of the above type which permits rewinding of a film strip in the camera without any presetting or rearrangement of the camera parts.

An additional object of the present invention is to provide a mechanism of the above type with a means for indicating to the operator the necessity of winding the film.

Still another object of the present invention is to provide a mechanism of the above type with a means for counting the number of film frames exposed.

With the above objects in view, the present invention mainly consists of a photographic camera having therein a sprocket wheel which is turnably mounted and adapted to be engaged by a film strip so that, on the one hand, the sprocket wheel is turned when the film strip is moved by a film transporting mechanism in the camera and, on the other hand, when the sprocket wheel is prevented from turning, the film transporting mechanism is prevented from moving the film strip. Fixed to the sprocket wheel is a cam cooperating with a releasable blocking means which in one position thereof engages the cam to prevent turning of the sprocket wheel and winding of the film strip and in another position thereof frees the cam and sprocket wheel therewith so that the film strip may be wound. This blocking means is maintained in its blocking position, against the action of a spring urging the same into its releasing position, by a shutter operating member which, when it is in its shutter arming position, has a part thereof located against the blocking means so as to prevent overwinding. When the shutter operating member is moved into the shutter releasing position thereof, a part of the blocking means moves over a part of the shutter operating member to prevent return of the same to its shutter arming position so that in this way a double exposure is prevented, the shutter operating member automatically returning to its shutter arming position, under the influence of a resilient means associated with the shutter operating member, when the blocking means is located again in its blocking position. The movement of the blocking means into its blocking position is effected through the above mentioned cam which, during winding of the film, engages a part of the blocking means to move it back into its blocking position.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a top plan view of the interior of a camera housing, illustrating the structure of the invention which is located in the camera housing;

Fig. 2 is a sectional view of the structure of Fig. 1 taken along line 2—2 of Fig. 1 in the direction of the arrows;

Figure 3:
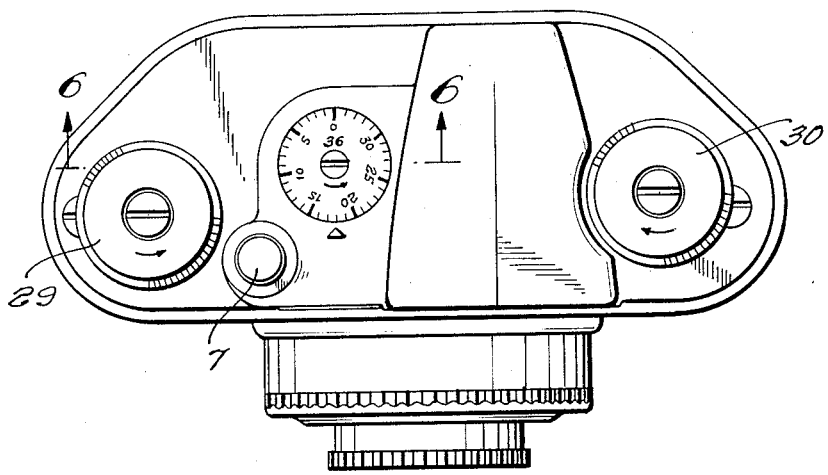
Fig. 3 is a top plan view of a camera constructed in accordance with the present invention.

Referring now to the drawings, there is shown in Fig. 1 the interior of a camera housing 25 where a supporting plate 1 is located. A shaft 2 has a part thereof turnably mounted in the plate 1 for movement about an axis normal to plate 1, and this shaft 2 turns in the direction of arrow 2' during winding of a film strip which has one end thereof attached to the shaft 2, as is clearly illustrated in Fig. 2. The film turning onto the shaft 2 comes from a shaft 14 also turnably mounted on the plate 1, this shaft 14 turning in the direction of the arrow 14' during rewinding of a film strip in a camera.

As the film strip moves, beneath the plate 1, toward the shaft 2, the apertures at an edge of the film strip engage the teeth of sprocket wheel 26 (Fig. 2) fixedly mounted on a shaft 4 which is freely turnable in the camera and has its upper end turnably supported by the plate 1. Thus, the sprocket wheel 26 will turn upon movement of a film strip, but when the sprocket wheel 26 is prevented from turning, it also prevents movement of the film strip. The shaft 4 extends through the plate 1 and has fixedly connected to the top end thereof a cam 5 which is spaced from the top surface of plate 1.

Fixedly mounted on the plate 1, and extending upwardly therefrom is a pivot pin 11 which turnably supports, next to the plate 1, a plate 6 and which turnably supports a plate 8 above the plate 6. The plate 6 also is provided with an upwardly extending projection 6b bearing against an edge of the plate 8. A spring 12 is connected at one end to the projection 6b and at its opposite end to a projection 10b of plate 8 to urge the projection 6b against part 8a of plate 8. The plate 1 has an upwardly extending projection 1a to which one end of a spring 13 is connected, this spring 13 being connected at its opposite end to a projection 10a of plate 8 so as to urge the latter, together with plate 6, in a counterclockwise direction about the pivot 11, as viewed in Fig. 1.

Figure 5:
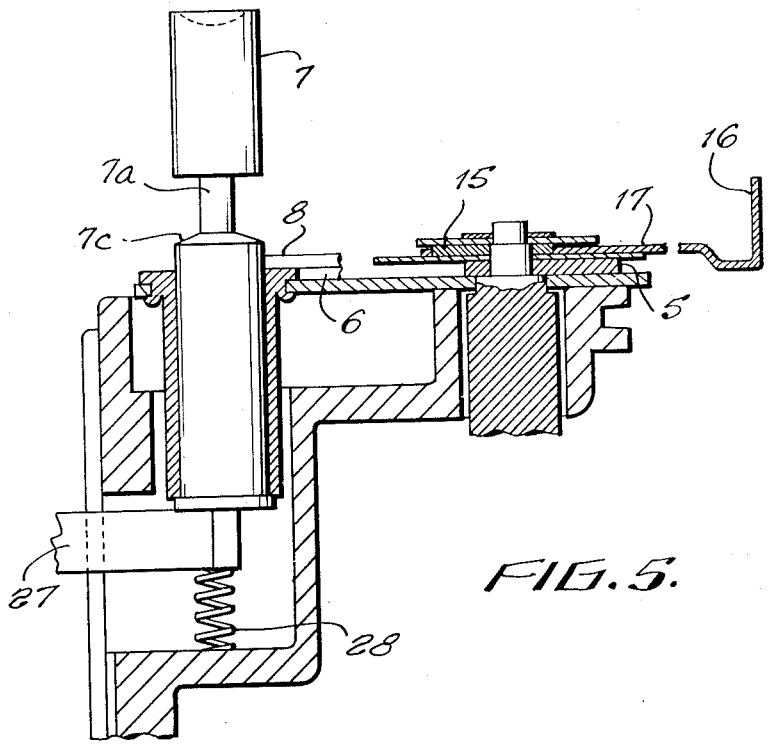
Fig. 5 is a fragmentary, partly sectional view taken along line 5—5 of Fig. 1 in the direction of the arrows.

Located next to edge 10 of plate 8 is a shutter operating member 7 which is supported in the camera for axial movement between a shutter arming and a shutter releasing position. This member 7 is clearly illustrated in Fig. 5 as being mounted for movement in the camera body, and a shutter actuating lever 27 is urged against the lower end of operating member 7 by a spring 28 so that the member 7 is continually urged upwardly into its shutter arming position. When this shutter operating member 7 is located in its shutter arming position, a part 7b thereof is engaged by edge 10 of plate 8 so that the shutter operating member itself thereby prevents turning of plates 8 and 6 in a counterclockwise direction about pivot 11, as viewed in Fig. 1. When the shutter operating member 7 is depressed to release the shutter and make an exposure, a part 7a of the shutter operating member 7 becomes located opposite the edge 10 of plate 8. As is clearly shown in the drawings, the part 7a of member 7 is of a smaller diameter than part 7b thereof so that, upon actuation of member 7, plates 6 and 8 will turn under the influence of spring 13.

As is clearly shown in Fig. 1, the plate 6 is provided with two legs 6a and 6b. The leg 6a engages the projection 5a of cam 5 to prevent turning thereof in the film winding direction. However, when the shutter operating mechanism is depressed as described above, movement of plate 8 under the influence of spring 13 causes part 8a of plate 8 to move plate 6, as a result of its engagement with projection 6b of plate 6. This turning movement of plate 6 moves the blocking leg 6a out of the path of turning movement of projection 5a of cam 5 so that the latter is freed for turning movement. The parts are so designed that the leg 6d of plate 6, upon depression of shutter operating mechanism 7, contacts the cam 5 before the edge 10 of plate 8 can contact part 7a of the member 7 so that in this way no shock is transmitted to member 7 and the operator feels nothing through the member 7 as a result of the release of the above described blocking mechanism. It is evident that this result is accomplished by having the angle included between two tangents to parts 7a and 7b, respectively, passing through the axis of pivot 11 larger than the angular distance about this axis between the nearest points of cam 5 and leg 6d when in the position of Fig. 1.

With the parts located with leg 6d of plate 6 against cam 5, it will be noted that the edge portion 10 of plate 8 will be located over the part 7c of member 7 which interconnects portions 7a and 7b thereof. As is clearly shown in the drawings, this connection portion 7c of member 7 is slightly conical and almost entirely in a plane which is substantially transverse to the axis of member 7. Therefore, when the operator releases the shutter member 7, the resilient means 28 will urge the same toward the shutter arming position thereof, but the slightly conical portion 7c will engage the plate 8 at edge 10 thereof and because of the sharp inclination of this connection portion 7c of member 7, the resilient means 28 will be incapable of moving the plate 8 against the action of spring 13, and instead the plate 8 will prevent movement of the shutter operating member 7 into its shutter arming position, although the lever 27 will have the shutter parts almost in their shutter operating position when part 7c of member 7 is against plate 8, so that in this way a double exposure is prevented, as will be apparent from the description below in connection with the film movement.

Thus, when the shutter operating member 7 is depressed, the spring 13 turns the plates 6 and 8 in a counterclockwise direction as viewed in Fig. 1, until leg 6d of plate 6 contacts cam 5, and the plate 8 prevents the shutter operating member 7 from assuming the shutter arming position. Since an exposure has been made by operation of the shutter operating member 7, the operator turns the winding knob 29 (Figs. 3 and 4) connected to shaft 2 so as to turn shaft 2 in the direction of arrow 2' (Fig. 1), and this turning of shaft 2 causes the film strip to become wound and to turn the sprocket 26 and shaft 4 therewith. The cam 5 also turns with the sprocket 26, and the blocking leg 6a is out of the path of movement of projection 5a of cam 5 so that this projection 5a moves into the space between legs 6a and 6d of plate 6 during movement of the film strip from shaft 14 toward shaft 2. As the cam 5 turns in a counterclockwise direction (Fig. 1), it comes into engagement with the leg 6d of plate 6 and moves the latter back toward the position shown in Fig. 1. This clockwise movement of plate 6, as viewed in Fig. 1, causes, through cooperation of projection 6b and part 8a of plate 8, the plate 8 to also turn in a clockwise direction together with plate 6 against the action of spring 13. Thus, when the plates 6 and 8 are again in the position shown in Fig. 1, the edge 10 of plate 8 moves off from the surface 7c of shutter operating member 7 so that the resilient means 28 then moves the member 7 back into the shutter arming position. The continued turning of cam 5 in a counterclockwise direction moves the plates 6 and 8 in a clockwise direction, as viewed in Fig. 1, about pivot 11 beyond the position illustrated in Fig. 1, and then these plates 6 and 8 move in a counterclockwise direction under the influence of spring 13 back to the position shown in Fig. 1 until edge 10 of plate 8 contacts part 7b of the shutter operating member 7. When the cam 5 has turned through a complete revolution, by turning of shaft 2 to wind the film, projection 5a thereof abuts against the blocking leg 6a of plate 6 to prevent further turning of cam 5, and the operator feels the resistance to the turning of shaft 2 as a result of the tensioning of the film between shaft 2 and sprocket wheel 26 so that he stops the turning of the knob 29 and the shaft 2. The parts are so designed that one complete revolution of shaft 4, and sprocket wheel 26 and cam 5 therewith, is equivalent to a single film frame so that the next portion of the film to be exposed is properly located simply by turning of knob 29 until cam 5 again abuts against the end of leg 6a of plate 6. Thus, the above described mechanism provides a unitary structure which is quite simple and which accomplishes the results of automatically preventing both overwinding and double exposure.

A particular advantage of the above described structure resides in the fact that no adjustments or preparations of any type are required for rewinding. Thus, when it is desired to rewind a film strip, the operator need only turn the knob 30 (Figs. 3 and 4) connected to shaft 14 so as to turn shaft 14 in the direction of arrow 14' (Fig. 1), and the film strip then moves from shaft 2 toward shaft 14. This causes the cam 5 to turn in a clockwise direction, as viewed in Fig. 1, and it is evident that the cam 5 is free to turn in this direction. The cam 5 will turn through several revolutions in this clockwise direction during rewinding of the film, and during each revolution of cam 5 it will first contact the leg 6d to turn plates 6 and 8 together in a clockwise direction, as viewed in Fig. 1, about pivot 11, against the action of spring 13, and then at the latter part of each revolution the cam 5 will contact the leg 6a to turn the plate 6 independently of plate 8 in a counterclockwise direction about pivot 11 against the action of spring 12, so that it is evident that the interconnection of the plates 6 and 8 through spring 12 permits this rewinding to take place in an exceedingly simple way.

Figure 6:
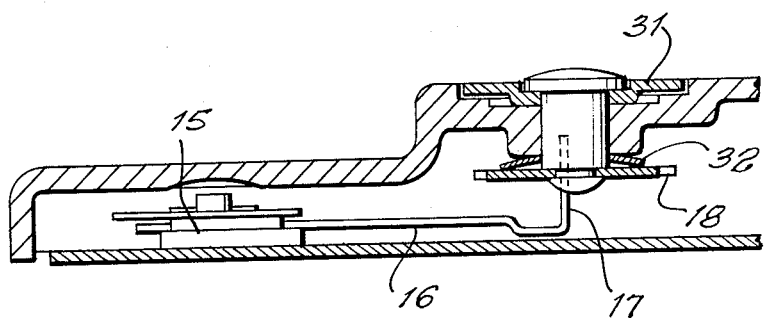
Fig. 6 is a sectional view taken along the lines 6—6 of Fig. 3 in the direction of the arrows.

Associated with the above-described parts is a counting device which turns the indicator disc 31 to indicate to the operator the number of exposures remaining. This counting mechanism takes the form of a ratchet wheel 18 frictionally joined by a spring 32 to a shaft on which the counter disc 31 is mounted so that the latter, which is constrained to rotate with this shaft, may be turned in either direction so as to be set with or without turning the ratchet 18 depending on the direction of rotation of disc 31. An elongated substantially L-shaped member 16 having an upstanding end 17 located against ratchet 18 is formed, at its left hand end, as viewed in Figs. 1 and 6, with an opening in which a disc 15, eccentrically connected to shaft 4 for rotation therewith, is located so that upon turning of shaft 4 the member 16 will be reciprocated back and forth with the part 17 of member 16 engaging a tooth of ratchet 18 to turn the same upon movement of member 16 to the left, as viewed in Fig. 1. The parts are so designed that during each revolution of shaft 4 the disc 31 will be turned through one of its graduations. A wire spring 19 wound about a post 35 on plate 1 has one end 36 stationary in an opening in plate 1 and with its opposite end portion engages a notch in part 17 of member 16 to urge part 17 thereof against ratchet wheel 18.

Figure 4:
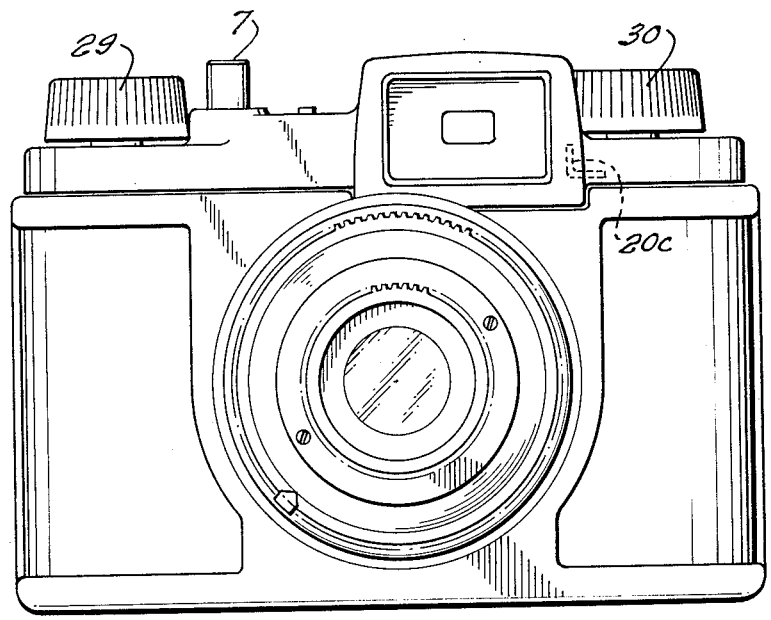
Fig. 4 is a front elevational view of a camera constructed in accordance with the present invention.

Also associated with the above described structure is a warning mechanism for indicating to the operator the necessity of winding a film strip. It will be noted that the plate 6 has an arm 6c located between the arms 20a and 20b of a member 20 which is pivotally mounted for turning movement about a pin 21 fixed to the plate 1 and extending upwardly therefrom. This plate 20 carries an extension 20c one end of which is adapted to move into and out of the viewfinder of the camera during movements of the plate 6. With the parts in the position illustrated in Fig. 1, the part 20c will be located out of the viewfinder area, as is indicated in Fig. 4. However, when the shutter operating member 7 has been depressed and leg 6d of plate 6 is located against cam 5, as described above, the part 20c will be located to the left of the position shown in Figs. 1, 2 and 4 so that the operator, upon looking through the viewfinder, will see the part 20c and will therefore know that it is necessary to wind the film. Only when the parts are in the position shown in Figs. 1 and 2 will the member 20c be located out of the viewfinder.

It will be understood that each of the elements described above, or two or more together, may also find a useful application in other types of photographic camera mechanisms differing from the types described above.

While the invention has been illustrated and described as embodied in photographic camera mechanisms for automatically preventing overwinding and double exposure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims;

What is claimed as new and desired to be secured by Letters Patent is:

1. In a photographic camera, in combination, a sprocket wheel turnably mounted in the camera and adapted to engage and be turned by a film strip, said sprocket wheel, when it is prevented from turning, preventing movement of the film strip; a cam fixed to said sprocket wheel for turning movement therewith; a plate turnably mounted in the camera and having a blocking leg located in the path of turning movement of said cam in a blocking position of said plate to prevent turning of said cam and sprocket wheel therewith and located out of the path of movement of said cam to free the latter for turning movement in a non blocking position of said plate, the plate having also a return leg spaced from said blocking leg and located adjacent said cam to be engaged thereby for turning said plate from said non-blocking position to said blocking position thereof when the film strip moves; spring means operatively connected to said plate for urging the same into said non-blocking position thereof; and shutter operating means engaging said plate for holding the latter in said blocking position thereof against the action of said spring means, until said shutter operating means is actuated.

2. In a photographic camera, a film transporting mechanism for transporting a film strip, said mechanism comprising, in combination, film receiving means turnably mounted in the camera and adapted to be manually turned to thereby transport a film strip; a film sprocket turnably mounted in the camera adjacent the path of film movement and adapted to engage and be turned by the film strip during transportation of the latter, said film sprocket, when it is prevented from turning, also preventing the transportation of the film strip; blocking means operatively connected to said film sprocket and being movable between a non-blocking position, permitting free turning of said film sprocket, and a blocking position automatically preventing turning of said film sprocket after the latter has turned through a predetermined angle; first spring means operatively connected to said blocking means to urge the same into said non-blocking position thereof; holding means engaging said blocking means and being movable between a holding position, holding said blocking means against the action of said first spring means to prevent movement of said blocking means into said non-blocking position thereof, and a non-holding position peritting free movement of said blocking means by said first spring means into said non-blocking position; second spring means engaging said holding means to urge the same from said non-holding into said holding position thereof, said holding means being manually movable against the action of said second spring means into said non-holding position thereof; and moving means connected to said sprocket for turning movement therewith and engaging said blocking means for moving the same against the action of said first spring means from said non-blocking into said blocking position thereof during each turning of said film sprocket through said predetermined angle, said movement of said blocking means into said blocking position thereof permitting said second spring means to move said holding means from said non-holding into said holding position where it holds said blocking means in said blocking position.

3. In a photographic camera, in combination, a sprocket wheel turnably mounted in the camera and adapted to engage and be turned by a film strip, said sprocket wheel, when it is prevented from turning, preventing movement of the film strip; a cam fixed to said sprocket wheel for turning movement therewith; plate means turnably mounted in the camera and having a blocking leg located in the path of turning movement of said cam in a blocking position of said plate means, to prevent turning of said cam and sprocket wheel therewith, and located out of the path of movement of said cam to free the latter for turning movement in a non-blocking position of said plate means, the latter also having a return leg spaced from said blocking leg and located adjacent said cam to be engaged thereby for turning said plate means from said non-blocking position to said blocking position thereof when the film strip moves during winding thereof; spring means operatively connected to said plate means for urging the same into said non-blocking position thereof; and an elongated control member movably mounted in the camera and having two substantially coaxial portions located next to each other and being of different thicknesses, the thicker of said portions engaging an edge of said plate means to hold the latter in said blocking position thereof, and movement of said control member along the length thereof locating the portion thereof of lesser thickness opposite said edge of said plate means to free the latter for turning movement under the action of said spring means into said non-blocking position thereof.

4. In a photographic camera, in combination, a sprocket wheel turnably mounted in the camera and adapted to engage and be turned about a predetermined axis by a film strip, said sprocket wheel, when it is prevented from turning, preventing movement of the film strip; a cam fixed to said sprocket wheel for turning movement about said axis therewith; plate means located beside said cam, being turnably mounted in the camera for movement about an axis parallel to said predetermined axis and having a blocking leg located in the path of turning movement of said cam in a blocking position of said plate means, to prevent turning of said cam and sprocket wheel therewith, and located out of the path of movement of said cam to free the latter for turning movement in a non-blocking position of said plate means, the latter also having a return leg spaced from said blocking leg and located adjacent said cam to be engaged thereby for turning said plate means from said non-blocking position to said blocking position thereof when the film strip moves during winding thereof; spring means operatively connected to said plate means for urging the same into said non-blocking position thereof; and an elongated shutter operating member mounted in the camera for movement between a shutter arming and a shutter release position, said shutter operating member having two portions of circular cross section located next to each other and being of different diameters, the larger of said portions engaging an edge of said plate means to hold the latter in said blocking position thereof when said shutter operating member is in said shutter arming position thereof, and movement of said shutter operating member along the length thereof to the shutter releasing position thereof locating the smaller of said portions thereof opposite said edge of said plate means to free the latter for turning movement under the action of said spring means into said non-blocking position thereof, the angle included between tangents to said two portions of said shutter operating member passing through the turning axis of said plate means being greater than the angular distance between the nearest points of said return leg of said plate means and said cam when said plate means is in said blocking position thereof so that said return leg of said plate means engages said cam to prevent engagement between said edge of said plate means and said smaller portion of said shutter operating member when the latter is moved to said shutter releasing position thereof.

5. In a photographic camera as defined in claim 4, a resilient means operatively connected to said shutter operating member to urge the same into said shutter arming position thereof, and said shutter operating member having between said portions thereof a conical surface portion urged against said edge of said plate means by said resilient means when said plate means is in said non-blocking position thereof so that said plate means thereby prevents movement of said shutter operating member into said shutter arming position thereof so as to prevent a double exposure, movement of said plate means into said blocking position thereof, by winding of the film strip and turning of the cam to engage said return leg of said plate means to turn the latter into said blocking position thereof against the action of said spring means, causing said edge of said plate means to move from said conical portion of said shutter operating member to free the latter to the influence of said resilient means so as to be moved into said shutter arming position where said larger portion of said shutter operating member engages said edge of said plate means to hold the latter in said one position thereof so as to prevent overwinding of the film strip.

6. In a photographic camera, in combination, a sprocket wheel turnably mounted in a camera and adapted to be engaged and turned, by a film strip in the camera, in opposite directions of rotation during winding and rewinding of the film strip; a cam connected to said sprocket wheel for turning movement therewith; a plate turnably mounted on the camera and having a pair of spaced legs located on opposite sides of said cam, one of said legs being a blocking leg engaging said cam to prevent turning of said sprocket wheel beyond a predetermined angle in one direction during winding of the film strip, and the other of said legs being engaged by said cam to turn said plate and move said one leg into the blocking position thereof; spring means connected to said plate for urging said blocking leg thereof out of its blocking position; releasable holding means engaging said plate for holding the latter against the action of said spring means in the position where said blocking leg thereof prevents turning of said cam and sprocket wheel in said one direction, said cam and sprocket wheel being free to turn in the other of said directions during rewinding of the film strip.

7. In a photographic camera, in combination, a sprocket wheel turnably mounted in the camera and adapted to be engaged by a film strip to be turned thereby during movement of the film strip; a cam fixed to said sprocket wheel for turning movement therewith; a first plate pivotally mounted in the camera beside said cam for turning movement about a predetermined axis and having a pair of spaced legs respectively facing opposite side edge portions of said cam; a second plate overlapping said first plate and also being pivotally mounted for movement about said predetermined axis; a projection on said first plate located next to a first edge portion of said second plate; a first spring interconnecting said projection of said first plate and said second plate to urge said projection against said first edge portion of said second plate so as to constrain said plates for turning movement together about said predetermined axis while permitting said first plate to turn independently of said second plate against the action of said first spring; a second spring connected to a stationary part of the camera and to said second plate and urging said first edge portion thereof against said projection of said first plate so that said first and second plates may turn together under the influence of said second spring about said predetermined axis; an elongated shutter operating member mounted for movement along its length in the camera and having a pair of coaxial portions located next to each other and being of different thicknesses, the thicker of said portions, when said shutter operating member is in the shutter arming position thereof, engaging a second edge portion of said second plate to hold the latter and said first plate therewith, against the action of said second spring, in a blocking position where one of said legs of said first plate engages said cam to prevent turning of the same and said sprocket wheel therewith so as to prevent overwinding of a film strip, the portion of lesser thickness of said shutter operating member, when the latter is in the shutter releasing position thereof, being opposite said second edge portion of said second plate to release the latter to the influence of said second spring so that said first and second plates are turned out of said blocking position to permit turning of said cam and sprocket wheel and winding of a film strip, and so that the other of said legs of said first plate engages said cam, said second edge portion of said second plate being located over a part of said thicker portion of said shutter operating member to prevent movement thereof into said shutter arming position; resilient means engaging said shutter operating member and urging the same into said shutter arming position thereof, movement of a film strip in the winding direction thereof causing said cam, through engagement with the other of said legs of said first plate, to move the latter and said second plate therewith against the action of said second spring into said blocking position to permit said resilient means to move said shutter operating member into said arming position thereof where said thicker portion of said shutter operating member engages said second edge portion of said second plate to maintain the latter and said first plate therewith in said blocking position, turning of said cam and sprocket wheel therewith during rewinding of a film strip causing said cam to move said first plate with respect to said second plate against the action of said first spring and to move said first and second plates together against the action of said second spring away from said shutter operating member.

References Cited in the file of this patent
UNITED STATES PATENTS

| 2,233,239 | Baumgartner | Feb. 25, 1941 |
| 2,308,934 | Ranft | Jan. 19, 1943 |
| 2,344,409 | Kuppenbender | Mar. 14, 1944 |
| 2,507,156 | Harvey | May 9, 1950 |
| 2,544,879 | Harvey et al. | Mar. 13, 1951 |
| 2,559,880 | Kesel et al. | July 10, 1951 |
| 2,672,797 | Blattner | Mar. 23, 1954 |

FOREIGN PATENTS

| 569,327 | Germany | Feb. 1, 1933 |